M. Lincoln,
Artificial Arm,
N° 39,487.  Patented Aug. 11, 1863.
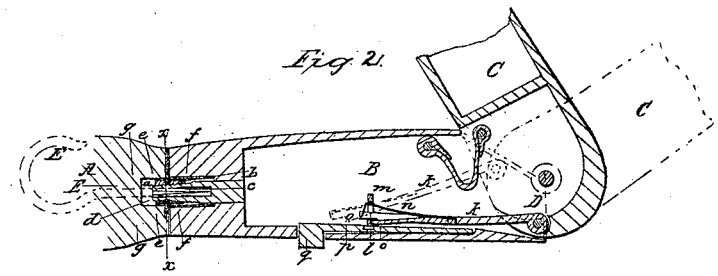
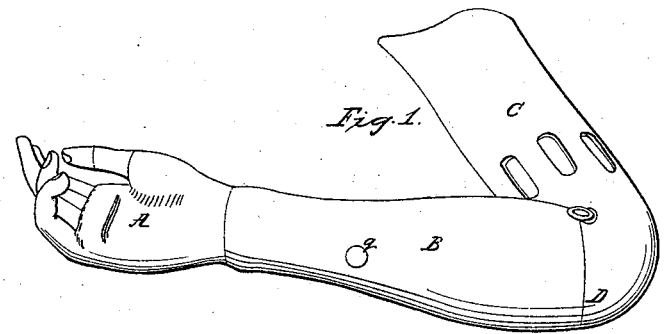
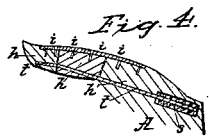  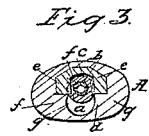
Witnesses:
J. B. Crosby
Francis Gould
Inventor:
Marvin Lincoln

UNITED STATES PATENT OFFICE.

MARVIN LINCOLN, OF MALDEN, MASSACHUSETTS.

IMPROVEMENT IN ARTIFICIAL ARMS.

Specification forming part of Letters Patent No. 39,487, dated August 11, 1863.

*To all whom it may concern:*

Be it known that I, MARVIN LINCOLN, of Malden, county of Middlesex, and State of Massachusetts, have invented an Improvement in Artificial Arms; and I do hereby declare that the following, taken in connection with the drawings which accompany and form part of this specification, is a description of my invention sufficient to enable those skilled in the art to practice it.

This invention consists in certain improvements in artificial arms, by which the wearers are enabled to make more use of the same than in such arms as now constructed and operated. Artificial arms as now used are operated by artificial tendons, ligaments, muscles, or straps, and the movements of the fingers are produced by movements of the arm, and depend upon such movements of the arm, or upon straps passing around different parts of the body, or upon straps extending from the arm and operated by the other or natural hand. These arms are expensive, easily disorganized, and give to the hand but very few useful capabilities. The hand is not capable of grasping articles firmly, depending for its usefulness upon artificial appendages, which cannot be applied so as to impart any great degree of resistance to the hand. My aim has been to so construct an arm as to give increased holding and grasping powers, while it is much more simple and less expensive than those now in use.

The improvements are shown in the accompanying drawings, which show views of the arm, partly in section and partly in elevation.

Figure 1 of the accompanying drawings represents a perspective view of my arm. Fig. 2 denotes a longitudinal section of the same. Fig. 3 shows a cross-section of the wrist on the line $x\ x$, Fig. 2.

A represents the hand; B, the forearm; C, the upper part of the arm; D, the elbow-joint. The lower end of the forearm, or the end of the wrist to which the hand is affixed, is made with a nut, $a$, have a tapering female screw, $b$, formed therein, said screw working upon the threads of a split tapering screw, $c$, made hollow, and so that the shank of a hook, E, or other instrument placed therein, may be gripped by the action of the nut $a$ in screwing it up on the screw $c$, or may be loosened to be detached from the arm by unscrewing the nut, which lets the opposite sides of the screw $c$ spring apart. The inner end of the screw $c$ is fastened firmly to the arm. The wrist end of the hand is made with a mortise, $d$, on the outer part of which a catch-plate, $e$, is fixed, and the opposite edges, $f\ f$, of the catch-plate extend over the mortise, and are made to slip and fit into two grooves, $g\ g$, cut on opposite sides of the nut $a$. The front part of the mortise is made of width equal to the external diameter of the nut $a$.

To affix the hand to the arm, the hand is slid over the nut $a$ until the edges $f$ come opposite the grooves $g\ g$, when they are pressed into the grooves. Then, by rotating the hand, the nut screws the hand up to and in contact with the arm, tightening to the proper degree as the hand comes into the right position with respect to the wrist, or so that the external line of wrist and hand join and correspond, and the two end surfaces impinge. To detach the hand, it is simply rotated sufficiently to bring the nut $a$ out to sufficient extent to separate the adjacent ends of the arm and wrist, and allow the edges $f\ f$ of the confining-plate to be slid out, when the hand is detached, the shank of the hook E (seen in dotted lines) may be inserted in the screw $c$ and fastened therein by the nut $a$. I make the hand solid, or without interior or external mechanism connecting with the arm for the purpose of giving motion to individual parts or members of the hand. The thumb of the hand is made without any external or visible mechanism, and so as to be incapable of any free movement or any movement controlled by mechanism in the arm, but at the same time it has a sufficient spring to allow a fork or other article upon being pressed in between the inner surface of the thumb and the forefinger to cause the thumb to give slightly and in such manner as to pinch or hold the article firmly and tightly in position between the thumb and fingers. To accomplish this, giving at the same time a perfect contour to the thumb, I make the thumb with one or more movable parts or joints, $h\ h$, as seen in Fig. 4, which denotes a longitudinal section of the thumb, connected together and to the lower immovable joint, $h'$, by hinges $i$, which hinges set into and are flush with the outer surface of the thumb. A stiff coiled spring, $s$, is fixed in the stationary joint $h$, to the lower end of which a cord, $t$, is fastened. The forearm is jointed or hinged to the upper arm in the usual manner.

To operate the forearm when an artificial elbow-joint has been used, straps have sometimes been employed, which, by connection with or operation by other parts of the body, are made to extend and flex the arm. Instead of using such straps, I adapt a mechanism to the forearm which shall allow it to be kept or fastened in a rigid position when flexed, with respect to the upper arm, and shall also allow it freely to extend or be extended when unfastened. This is accomplished as follows: A latch, rod, or bar, $k$, is jointed at one end to the upper arm, $c'$, the rod extending into the forearm and passing at its other end between a stop, $l$, and cross-bar $m$. A spring, of stiff wire, $n$, is applied to the back of the latch $k$, said spring bearing the bar $m$ and forcing the opposite edge or side of the latch bar against the stop $l$. When the forearm is extended, the rod $k$ lies and slides freely between the stop $l$ and bar $m$. As it is bent to nearly its fullest extent, the spring $n$ forces the latch hard against the stop $l$ until the arm reaches its extent of movement, when the latch-catch $o$, by the action of the spring, flies down over the stop $l$, and so bears against the stop as to keep the forearm locked in position and prevent any extension of the same. A lifter-piece, $p$, is jointed at one end to the forearm, and, extending along under the latch and stop $l$, has a knob or finger-piece, $q$, on its other end, said piece extending through the arm, as seen in the drawings. By pressure of this finger-piece when the forearm is locked, the lifter $p$ is raised, and pushes the catch $o$ up above the stop $l$ and allows the forearm to extend or drop, the spring and latch-bar sliding back between the stop $l$ and bar $m$. As its own weight keeps it hanging much more easily and naturally than if it were rigidly fastened to the upper arm, it is not necessary or advisable to lock it when in this position. To flex the arm, it is only necessary to give the upper arm a quick forward jerking motion, which throws up the forearm, causing the latch-spring and catch to so operate as to lock it in position. When thus bent, the arm is generally thrown across and against the breast, assuming then an easy and graceful position, and it may also be used to carry pieces of clothing or other bundles, the bent and rigid position of the arm enabling it thus to act, having in this way a capability not possessed by any other arm now made.

By reference to Fig. 1 of the drawings, it will be seen that I do not give to all the fingers an extended position in their solid and immovable construction, but that while making the two forefingers, $v\ v$, nearly straight, so that they will have the proper position to enable them to act in conjunction with the spring-thumb to hold or firmly grasp any article between them, I give to the outer fingers, $v'\ v'$, a hooking form, so that the outer joint shall bend up toward the wrist. This manner of construction enables me to impart to the hand not only a graceful or ornamental form, but to give it also a capacity to carry articles like baskets, bags, &c., by hooking them onto the fingers.

I claim—

1. Applying to an artificial arm a detachable hand, made capable in itself of holding and grasping in the manner as set forth, and of being removed for the attachment of a hook or other instrument by the mechanism described.

2. The combination of hinges $i$, joints $h$, spring $s$, and cord $t$, applied to the thumb as set forth.

3. Combining with the solid and rigid fingers a movable or spring thumb, arranged and operated, with respect to the hand, as above described.

4. Giving to all or part of the fingers, when made of solid and rigid construction, as described, a curved hooking form, for the purpose specified.

5. Applying a locking mechanism, substantially as described, to operate in connection with the parts B C, for the purpose of locking the forearm in position.

6. Combining in an artificial hand a spring-thumb and rigid fingers, having a grasping function, with fingers having a rigid and hooking form, to give them a holding function, as set forth.

MARVIN LINCOLN.

Witnesses:
J. B. CROSBY,
FRANCIS GOULD.